April 12, 1966   D. BASOLO ET AL   3,245,520
AUTOMATIC STOP FOR BELT CONVEYOR
Filed June 2, 1964   2 Sheets-Sheet 1
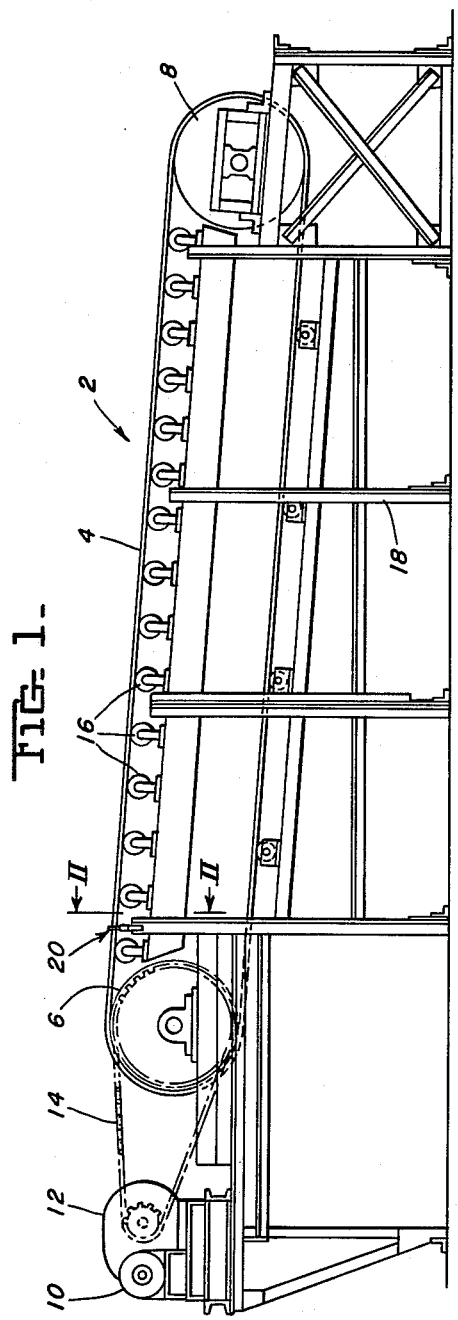
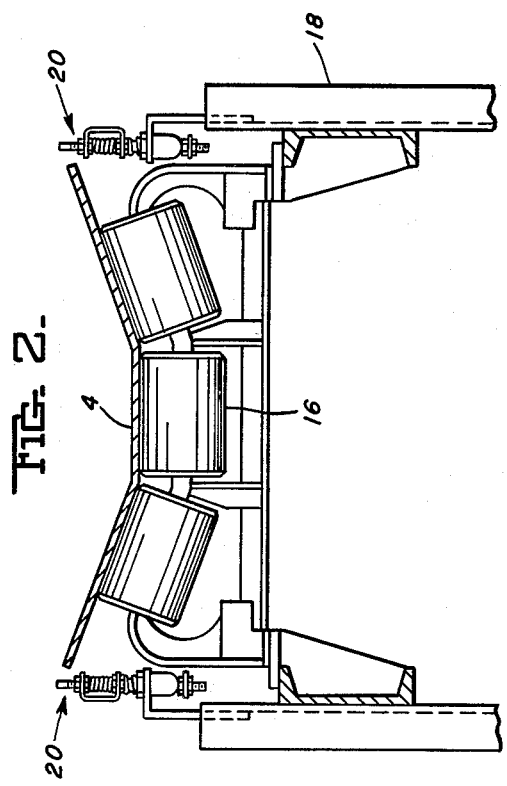
INVENTORS.
DOMENIC BASOLO and
RONALD NIEWIADOMSKI
By Donald G. Dalton
Attorney April 12, 1966  D. BASOLO ET AL  3,245,520
AUTOMATIC STOP FOR BELT CONVEYOR
Filed June 2, 1964  2 Sheets-Sheet 2
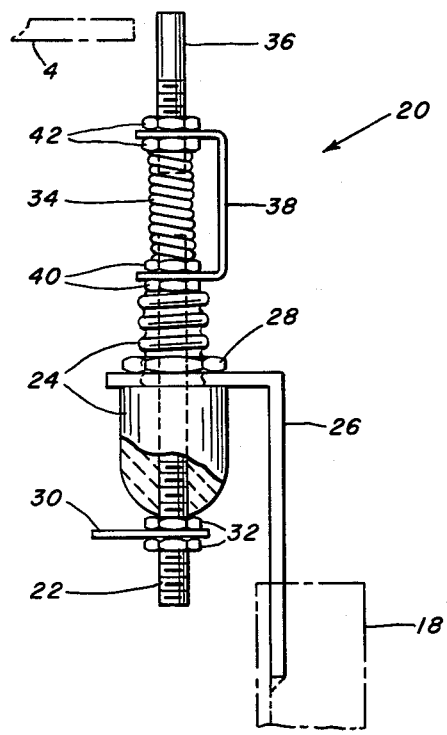
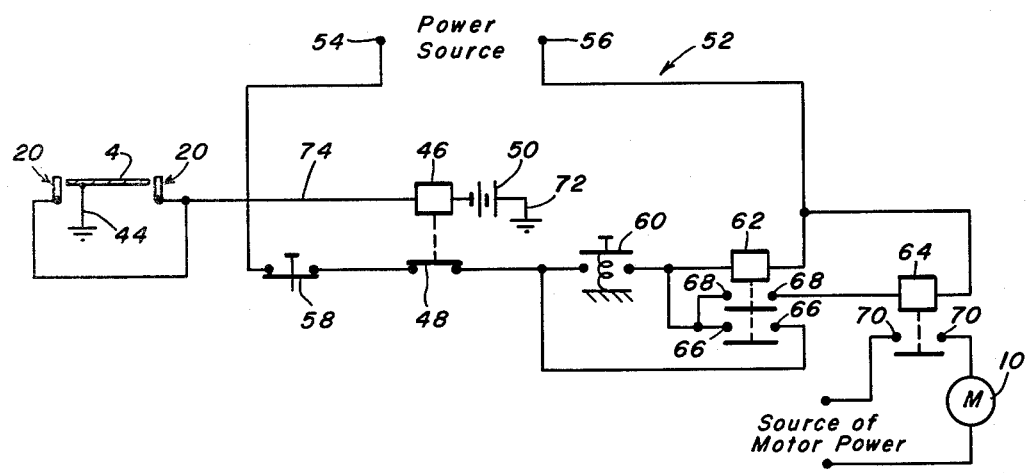
INVENTORS.
DOMENIC BASOLO and
RONALD NIEWIADOMSKI
By Donald G. Dalton
Attorney United States Patent Office 3,245,520
Patented Apr. 12, 1966

3,245,520
AUTOMATIC STOP FOR BELT CONVEYOR
Domenic Basolo and Ronald Niewiadomski, Chicago, Ill., assignors to United States Steel Corporation, a corporation of Delaware
Filed June 2, 1964, Ser. No. 371,909
1 Claim. (Cl. 198—232)

The present invention relates generally to apparatus for handling material and, more particularly, has as its primary object the provision of an improved device for automatically stopping the operation of a metal belt conveyor when it is tracking improperly.

It is a more specialized object of our invention to provide a device of the character set forth above which includes electrode pins upstanding on both sides of a metal belt conveyor spaced from the normal path thereof and an electrical relay, which is connected with the pins and the drive motor of the conveyor, adapted to be energized on contact therewith by the belt when it is not tracking properly so as to stop the motor.

As a corollary to the above, it is another object of our invention to provide a device of the character described in which the electrode pins are resiliently mounted to prevent damage to the metal belt.

These and other objects will become more apparent after referring to the following specification and attached drawings, in which:

FIGURE 1 is an elevational view of a belt conveyor equipped with the device of the invention;

FIGURE 2 is a cross-sectional view taken on the line II—II of FIGURE 1;

FIGURE 3 is an enlarged elevational view of an electrode pin assembly of the invention; and FIGURE 4 is a diagram of the electric control circuit of the invention.

Referring more particularly to the drawings, reference numeral 2 designates generally a substantially horizontally disposed conveyor which includes an endless metal belt 4 trained around a head pulley 6 and a tail pulley 8. The head pulley 6 is driven by means of a motor 10 through a gear reducer 12 and chain 14. Troughing idler rolls 16 journaled on the conveyor frame 18 support the upper flight of the metal belt 4.

The apparatus thus far described is conventional and is not claimed as our invention, the details of which will now be described in detail.

Reference numeral 20 designates a pair of electrode pin assemblies insulatingly mounted on and projecting upwardly from the frame 18, one on each of the opposite sides of the belt 4 spaced from the normal path thereof.

As best shown in FIGURE 3, each of the electrode pin assemblies 20 includes a threaded brass rod 22 having an insulator sleeve 24 mounted thereon intermediate its ends. The upper portion of the insulator sleeve 24, which is of reduced diameter and is externally threaded, is fitted into a bracket 26 which, in turn, is mounted on the conveyor frame 18. The insulator sleeve 24 is secured in the bracket 26 by means of a lock nut 28. An electrical conductor lead 30 is fastened to the lower portion of the rod 22 below the insulator sleeve 24 by means of a pair of lock nuts 32.

A helical compression spring 34 is telescoped over the upper end of the brass rod 22 and the threaded lower end of a relatively short brass rod 36. A shunt 38 bypasses the spring 34 and is connected to the upper end of rod 22 and the lower end of rod 36 by lock nuts 40 and 42, respectively. The upper portion of rod 36 is smooth and contacts the edge of belt 4 when the latter is not tracking properly. When such contact is made, the current flows from the conductor lead 30 through the brass rod 22, the shunt 38 and the short brass rod 36 to the metal belt 4 which is electrically grounded by a ground connection 44 on one of the idler rolls, as will be more fully explained hereinafter.

FIGURE 4 is a diagram of an electric control circuit for operating the drive motor 10 of the conveyor 2. The circuit 52 includes an electrical relay 46 having a normally-closed set of contacts 48 and a low voltage battery 50, or any other low-voltage electrical power source, such as a step-down transformer (not shown) or the like. The relay 46 must be energized to open the normally-closed contacts 48. When the belt 4 is in proper alignment and tracking properly, the relay 46 is not energized and the contacts 48 remain closed.

Circuit 52 includes power lines 54 and 56 connected to a suitable power source, a manually-operable, normally-closed stop-switch 58, a spring-return, manually-operable start-switch 60, a starter relay 62 and a motor relay 64. The drive motor 10 is connected with a suitable power source.

In normal operation, the start-switch 60 is closed momentarily to energize starter relay 62 and close its contacts 66 and 68. Closing of contacts 66 completes a lock-in circuit around start-switch 60 so that relay 62 remains energized after the start-switch is released. Closing of contacts 68 completes a circuit to and energizes the motor relay 64 so that its contacts 70 are closed and a circuit to the motor 10 is completed.

If, while the conveyor 2 is operating, the belt 4 contacts the brass rod 36 of one of the electrode pin assemblies 20, a circuit is completed from the ground connection 44 of belt 4 through the metal belt 4 and the electrode pin assembly to the relay 46, the battery 50 and the grounded conductor 72. This causes the relay 46 to be energized so that contacts 48 thereof are opened and the starter relay 62 is de-energized and its contacts 66 and 68 are opened and flow of current to the motor relay 64 is interrupted so that motor 10 stops. It will be noted that even if the relay 46 is de-energized and its contacts 48 closed, the motor 10 will not start again until the start-switch 60 is momentarily closed. This feature insures that the conveyor will not start to operate again until the cause of the misalignment of belt 4 and the improper tracking thereof has been found and corrected.

Tripping the stop-switch 58 manually will also interrupt the flow of current to the starter relay 62 and the motor relay 64.

The resilient mounting of the electrode pin assemblies 20 provided by the springs 34 prevents damage to the edge of the belt 4 when the latter contacts one of the rods 36. The electrical conductor leads 30 are both connected with one side of relay 46 by a conductor 74.

While one embodiment of our invention has been shown and described, it will be apparent that other adaptations and modifications may be made without departing from the scope of the following claim.

We claim:
In a conveyor apparatus including a metal conveyor belt traversing supporting rollers journaled in a supporting frame, and a motor driving said belt, the improvement therewith of upstanding electrode pins insulatingly mounted on said frame on both sides of said belt spaced from the normal path thereof, said pins being resiliently mounted on said frame, and an electric relay connected to said pins adapted to be energized on contact therewith by said belt, effective to stop said motor.

References Cited by the Examiner
UNITED STATES PATENTS

| | | | |
|---|---|---|---|
| 2,075,111 | 3/1937 | Gulliksen et al. | |
| 2,304,843 | 12/1942 | Nordquist | 198—202 X |
| 3,153,474 | 10/1964 | Wintriss | 198—40 |

HUGO O. SCHULZ, *Primary Examiner.*

SAMUEL F. COLEMAN, *Examiner.*